United States Patent [19]

Leeuwenburg et al.

[11] Patent Number: 5,380,017

[45] Date of Patent: Jan. 10, 1995

[54] SEALING RING FOR SEALING AGAINST FLUID FLOW IN EITHER DIRECTION BETWEEN INNER AND OUTER PIPES

[75] Inventors: Ewout Leeuwenburg, Dordrecht; Robert J. Van Kooij, Zwijndrecht, both of Netherlands

[73] Assignee: Nyloplast Europe B.V., 's-Gravendeel, Netherlands

[21] Appl. No.: 679,243

[22] Filed: Apr. 2, 1991

[30] Foreign Application Priority Data

Apr. 12, 1990 [NL] Netherlands ............... 9000881

[51] Int. Cl.⁶ ............................................. F16J 15/32
[52] U.S. Cl. ............................... 277/207 A; 277/27; 277/152; 285/110
[58] Field of Search ............... 285/110, 111, 910, 95, 285/349, 350, 351, 369; 277/184, 205, 206 R, 207 A, 208, 27, 152

[56] References Cited

U.S. PATENT DOCUMENTS

| | | | |
|---|---|---|---|
| 2,809,853 | 10/1957 | Nathan | 277/207 A X |
| 2,867,462 | 1/1959 | Nielsen | 277/152 |
| 2,935,349 | 3/1960 | Burch | 285/110 X |
| 3,315,971 | 4/1967 | Sakurada | 285/110 |
| 3,573,871 | 4/1971 | Warner | 285/110 X |
| 4,097,076 | 6/1978 | Wackenreuther et al. | 285/111 X |
| 4,194,766 | 3/1980 | Hsu | 285/110 |
| 4,298,184 | 11/1981 | Grünert et al. | 277/152 X |
| 4,337,956 | 7/1982 | Hopper | 277/152 X |
| 4,343,480 | 8/1982 | Vassallo | 277/207 A |
| 4,487,421 | 12/1984 | Housas et al. | 277/207 A |
| 4,572,523 | 2/1986 | Guettouche et al. | 277/207 A |
| 4,579,354 | 4/1986 | Vassallo et al. | 277/207 A |
| 4,602,793 | 7/1986 | Andrick | 277/207 A |
| 4,625,383 | 12/1986 | Vassallo et al. | 277/207 A X |
| 4,693,483 | 9/1987 | Valls | 285/110 X |
| 4,838,582 | 6/1989 | Hatakeyama et al. | 285/110 |
| 4,991,858 | 2/1991 | Abila et al. | 285/110 X |

FOREIGN PATENT DOCUMENTS

| | | | |
|---|---|---|---|
| 0569311 | 1/1959 | Canada | 285/110 |
| 0099529 | 2/1984 | European Pat. Off. | |
| 1278152 | 10/1961 | France | 285/111 |
| 1272650 | 7/1968 | Germany | 285/110 |
| 2402022 | 9/1974 | Germany | 285/110 |
| 2402023 | 9/1974 | Germany | 285/110 |
| 2713767 | 10/1978 | Germany | 277/207 A |
| 0011271 | 2/1978 | Japan | 285/110 |
| 6713728 | 4/1969 | Netherlands | 285/110 |
| 7802712 | 10/1979 | Switzerland | 285/110 |
| 1080816 | 8/1967 | United Kingdom | 285/110 |
| 2052661 | 1/1981 | United Kingdom | |

Primary Examiner—William A. Cuchlinski, Jr.
Attorney, Agent, or Firm—Young & Thompson

[57] ABSTRACT

Sealing ring of an elastic material, for use in a pipe coupling in which the ring is placed in a radially inwardly open peripheral groove and is retained in said groove by means of a supporting ring(6) which sealing ring in each radial cross-section is the shape of an inwardly open, essentially rectangular trough with a circular bottom (2), a projecting lip (8) being provided which runs inwards at an angle from the end of the first circumferential wall of the trough, the free end of which lip lies at a radial distance from the axis of symmetry of the ring which is smaller than the external radius of the push-in end part of a pipe to be coupled and at the end of the second side wall of the trough, the free end of which lip lies at a greater distance from the above-mentioned axis than the free end of the first lip, the second lip being provided with a run-on face (10) which runs from a point near the bottom of the lip in the direction of that axis to an end point which lies at a distance from the axis which is smaller than the distance between the axis and the free end of the second lip, while the trough is of a depth which is greater than the radial thickness of the supporting ring, so that in the fitted state and with a push-in end part pushed through the ring an open space (14) is present between the supporting ring and the outwardly facing faces of the first and second lip.

3 Claims, 1 Drawing Sheet

SEALING RING FOR SEALING AGAINST FLUID FLOW IN EITHER DIRECTION BETWEEN INNER AND OUTER PIPES

FIELD OF THE INVENTION

The invention relates to a sealing ring of an elastic material, for example a rubber, for use in a pipe coupling in which the ring is placed in a radially inwardly open peripheral groove at the receiving end part of a pipe and is retained in said groove by means of a supporting ring, so that the ring can form a seal between the inside of said pipe and the external periphery of the push-in end part of a second pipe pushed into the ring, and in the fitted and coupled state the axis of symmetry lying at right angles to the plane of the ring coincides with the central axes of the pipe openings of the coupled pipes, which sealing ring in each radial cross-section is the shape of an inwardly open, essentially rectangular trough with a circular bottom, in which the supporting ring can be accommodated in such a way that it rests against the bottom, a projecting lip being provided which runs inwards at an angle from the end of the first circumferential wall of the trough, which wall forms the outer wall in the fitted state of the sealing ring the free end of which lip lies at a radial distance from the above-mentioned axis of symmetry of the ring which is smaller than the external radius of the push-in end part of a pipe to be coupled. Such a sealing ring is generally known.

BACKGROUND OF THE INVENTION

Sealing rings of the above-mentioned type are used particularly for the coupling of sewer pipes, or in general pipes for the discharge of effluent, which are dug in to below ground level and can therefore lie below groundwater level, so that the sealing rings have to be capable of sealing not only relative to an internal, but also relative to an external excess pressure.

In the case of the known sealing ring, when the push-in end part of a pipe is being inserted into the ring the single lip present there is pressed against the supporting ring, so that said lip is compressed between the external surface of the push-in end part and the supporting ring.

The disadvantage of the known sealing ring is that in order to bring about the coupling between two pipes in which the push-in end part of one pipe must be pushed through the sealing ring fitted in the other pipe great axially directed forces must be exerted, which makes the production of the pipe coupling unacceptably difficult. Besides, in the coupling which has been made the seal relative to an external excess pressure leaves something to be desired.

BRIEF SUMMARY OF THE INVENTION

The object of the invention is to provide an improved sealing ring of the above-mentioned type which does not have these disadvantages.

This object is achieved in that in the case of the sealing ring according to the invention an inwardly projecting second lip is formed at the end of the second or inner side wall of the trough, the free end of which lip lies at a greater distance from the above-mentioned axis of symmetry of the ring than the free end of the first lip, the second lip being provided with a run-on face which runs from a point near the bottom of the lip in the direction of said axis to an end point which lies at a distance from the said axis which is smaller than the distance between the axis and the free end of the second lip, while the trough is of a depth which is greater than the radial thickness of the supporting ring, so that in the fitted state and with a push-in end part pushed through the ring an open space is present between the supporting ring and the outwardly facing faces of the first and second lip.

In a sealing ring designed in this way, when fitted and during the insertion of a push-in end part, the first lip is pressed only slightly outwards, so that the inwardly facing surface thereof nestles against the external surface of the push-in end part, which movement of the first lip requires the exertion of only a relatively slight axially directed force, while on further insertion of the push-in end part this part comes up against the run-on face, as a result of which the second lip is swung inwards and is thereby pressed against the external surface of the push-in end part, which movement also requires only a relatively slight axial force.

If an external excess pressure now occurs as a result of the groundwater, then this water will possibly be able to penetrate between the push-in end part and the first lip resting against it until it is in the above-mentioned open space, but then, as said excess pressure increases, will press the second lip more forcefully against the push-in end part, so that said water cannot flow into the sewer pipe.

On the occurrence of an internal excess pressure, sewer water may be able to penetrate between the push-in end part and the second lip lying against it until it reaches the above-mentioned open space, but this will cause the first lip to be pressed more forcefully against the push-in end part, as said excess pressure increases, so that the sewer water cannot flow outwards out of the sewer pipe.

A step is advantageously formed in the part of the circular bottom of the trough adjacent one of its walls, so that a bottom part is present, lying a shorter distance from the axis of symmetry than the remainder of the bottom part, while the supporting ring rests against this remaining bottom part, with the result that the entire part of the sealing ring lying adjacent the supporting ring is more flexible.

A circular groove is preferably provided in the external face of the second wall of the trough, so that the second lip is formed on a thinned wall part of the trough. In this way the hinged action of the fixing of the second lip is improved.

BRIEF DESCRIPTION OF THE DRAWING

The invention is explained in greater detail with reference to the example of an embodiment shown in the drawing, in which.

DETAILED DESCRIPTION OF THE INVENTION

Figure 1:
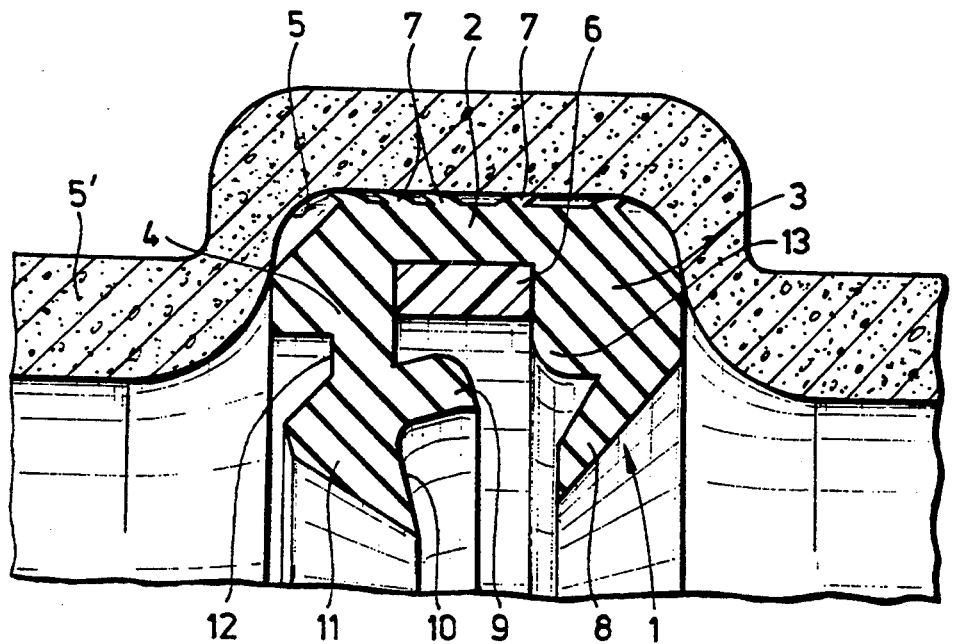
FIG. 1 shows a sealing ring according to the invention, when fitted.

As shown in the drawing, the sealing ring 1 according to the invention has in each radial cross-section the shape of a trough with a circular bottom 2 and two side walls 3 and 4. The ring 1 is accommodated in a peripheral groove 5 which is formed at the sleeve-shaped receiving end part of a pipe 5", the ring 1 being held fast by means of a supporting ring 6. Sawtooth-shaped projections 7 are provided in the external surface of the bottom 2, for the purpose of obtaining a good seal between the ring 1 and the internal surface of the peripheral groove 5.

A first inwardly slanting lip 8 is formed at the free end of the wall 3, and a second slanting lip 9 is formed at the free end of the wall 4. The external surface of the lip 9 merges into a run-on face 10, which in turn merges into an outwardly slanting face 11.

A circular groove 12 is formed in the external surface of the wall 4, so that the lip 9 is connected by means of a thinned wall part to the remaining part of the wall 4.

An inwardly facing step 13 is formed in the bottom 2, so that the supporting ring 6 is accommodated only in the part of the bottom 2 lying adjacent said step 13.

Figure 2:
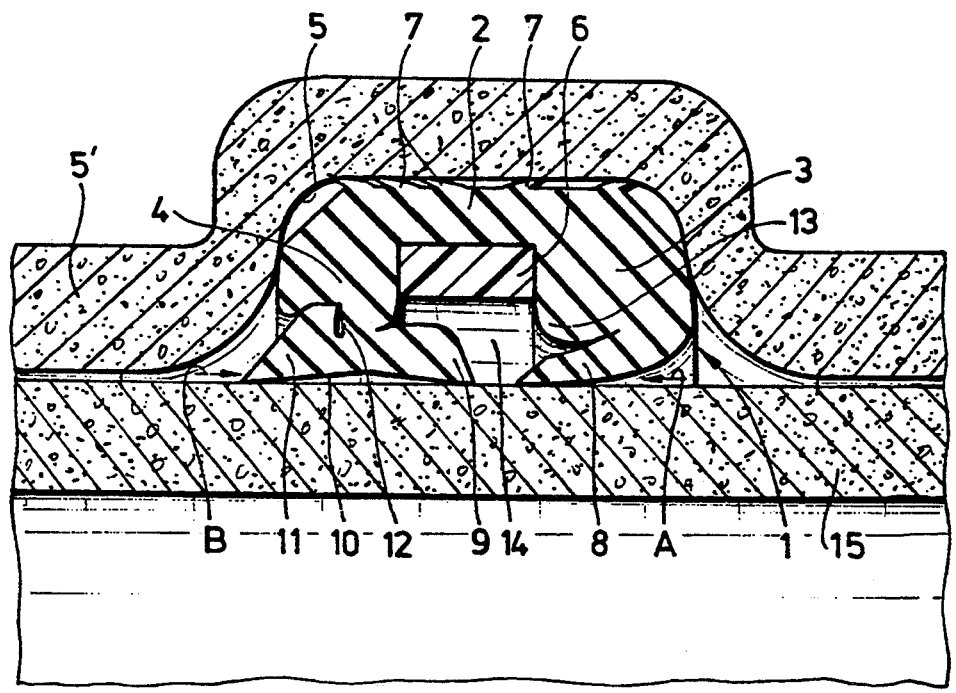
FIG. 2 shows the sealing ring of FIG. 1 with a push-in end part pushed through it.

As shown in FIG. 2, when a push-in end part 15 of a second pipe is being pushed through the sealing ring 1, from the right in the drawing, the lip 8 is first pressed outwards and the inwardly facing surface of said lip nestles against the external surface of the push-in end part 15, following which, on further pushing in of the push-in end part, this part slides along the lip 9 and then goes against the run-on face 10, as a result of which the lip 9 is swung inwards about a hinge which is determined by the groove 12. In this way, in the coupled position shown in FIG. 2, an open space 14 is formed between the supporting ring 6 and the outwardly facing faces of the lips 8 and 9.

If an external excess pressure now occurs, as a result of groundwater, then this water will possibly be able to penetrate between the push-in end part 15 and the first lip 8 lying against it, in the direction of the arrow A, until it reaches the open space 14, but then, as this excess pressure increases, the lip 9 will be pressed more forcefully against the push-in end part 15, so that this water cannot flow into the sewer pipe.

If, on the other hand, an internal excess pressure occurs, then sewer water will possibly be able to penetrate between the push-in end part 15 and the lip 9 resting against it, in the direction of the arrow B, until it reaches the open space 14, but as a result the lip 8 will be pressed more forcefully against the push-in end part 15 as said excess pressure increases, so that the sewer water cannot flow out of the sewer pipe to the outside.

We claim:

1. A sealing ring of an elastic material for sealing against the flow of fluid between an inner and an outer pipe between which pipes said sealing ring is disposed, said sealing ring being circular and having a central axis and first and second radially inwardly extending annular lips defining an annular open space between said lips, said first lip having a configuration such that a said inner pipe, when inserted into said sealing ring in one direction, deforms said first lip radially outwardly into sealing contact with said inner pipe, said second lip having a radially outwardly disposed first portion and a radially inwardly extending second portion so disposed that a said inner pipe moving in said one direction slides past said first portion and contacts said second portion and deflects said second portion in said one direction thereby pivoting said first portion of said second lip radially inwardly into sealing contact with said inner pipe, said first lip and said first portion of said second lip, when in sealing contact with said inner pipe, presenting to said open space surfaces such that upon an increase in fluid pressure in said open space due to leakage past said first lip in said one direction, said first portion of said second lip is pressed with increased pressure into sealing contact with said inner pipe to prevent flow of fluid from said open space in said one direction past said sealing ring, and upon an increase in fluid pressure in said open space due to leakage past said second lip in a direction opposite to said one direction, said first lip is pressed with increased pressure into sealing contact with said inner pipe to prevent flow of fluid from said open space in said opposite direction, said surfaces presented by said first sealing lip and said first portion of said second sealing lip to said open space meeting said inner pipe at acute angles oppositely directed to said axis.

2. A sealing ring as claimed in claim 1, in which said first and second portions of said second lip are connected to a radially outer portion of said sealing ring by a thinned wall of said second lip, thereby to promote swinging movement of said second lip upon movement of said inner pipe in said one direction.

3. A sealing ring as claimed in claim 1, further comprising a supporting ring that radially outwardly bounds said annular open space.

* * * * *